US012647025B2

(12) United States Patent
Dalena

(10) Patent No.: US 12,647,025 B2
(45) Date of Patent: Jun. 2, 2026

(54) SOFT SWITCHING VOLTAGE DIVIDER CIRCUIT

(71) Applicant: Apple Inc., Cupertino, CA (US)

(72) Inventor: Francesco Dalena, Leghorn (IT)

(73) Assignee: Apple Inc.

( * ) Notice: Subject to any disclaimer, the term of this patent is extended or adjusted under 35 U.S.C. 154(b) by 367 days.

(21) Appl. No.: 18/156,382

(22) Filed: Jan. 18, 2023

(65) Prior Publication Data

US 2024/0204668 A1     Jun. 20, 2024

Related U.S. Application Data

(60) Provisional application No. 63/476,098, filed on Dec. 19, 2022.

(51) Int. Cl.
H02M 3/158     (2006.01)
H02M 1/00     (2006.01)
H02M 3/00     (2006.01)

(52) U.S. Cl.
CPC ........... H02M 3/01 (2021.05); H02M 1/0009 (2021.05); H02M 1/0058 (2021.05); H02M 3/158 (2013.01)

(58) Field of Classification Search
CPC .... H02M 1/0009; H02M 1/0058; H02M 3/01; H02M 3/07; H02M 3/072; H02M 3/156; H02M 3/158
See application file for complete search history.

(56) References Cited

U.S. PATENT DOCUMENTS

| | | | |
|---|---|---|---|
| 9,564,817 B2 | 2/2017 | Stuler et al. | |
| 10,170,974 B1 | 1/2019 | Oh et al. | |
| 2009/0059630 A1* | 3/2009 | Williams ............ | H02M 3/1588 |
| | | | 363/60 |
| 2015/0124489 A1* | 5/2015 | Dai ........................ | H02M 3/335 |
| | | | 363/17 |
| 2016/0329809 A1 | 11/2016 | Granato et al. | |
| 2017/0338748 A1* | 11/2017 | Liang .................... | H02M 7/483 |
| 2020/0186039 A1* | 6/2020 | Cheng ................. | H02M 3/1588 |
| 2020/0220468 A1* | 7/2020 | Rainer .............. | H02M 3/33523 |
| 2021/0367520 A1* | 11/2021 | Liu ........................ | H02M 3/158 |
| 2021/0367525 A1 | 11/2021 | Deng et al. | |
| 2023/0020726 A1* | 1/2023 | Jin ....................... | H02M 1/0095 |
| 2023/0089387 A1* | 3/2023 | Wijekoon ............. | H02M 1/007 |
| | | | 323/271 |
| 2023/0231481 A1* | 7/2023 | Wang ................... | H02M 3/1586 |
| | | | 323/282 |
| 2023/0353052 A1* | 11/2023 | Nicolosi ............... | H02M 3/158 |

* cited by examiner

*Primary Examiner* — Gary L Laxton
(74) *Attorney, Agent, or Firm* — Kowert, Hood, Munyon, Rankin & Goetzel, P.C.; Gentry C. McLean; Dean M. Munyon

(57)     ABSTRACT

A switched-capacitor circuit for use in a high-efficiency power subsystem is disclosed. The switched-capacitor circuit includes a resonant circuit and multiple switches that couple the resonant circuit between an input power supply node and an output node to generate a voltage on the output node that is less than the voltage of the input power supply node. A sense circuit measures the current flowing through the resonant circuit and a control circuit opens and closes different ones of the multiple switches in response to a determination that the current flowing through the resonant circuit is less than a threshold value.

15 Claims, 11 Drawing Sheets

$I_{DS}$
502

$V_{DS}$
501

Turn-on
Losses t1 t2

Turn-off
Losses time $I_{DS}$
504

$V_{DS}$
503 t1 t2 time

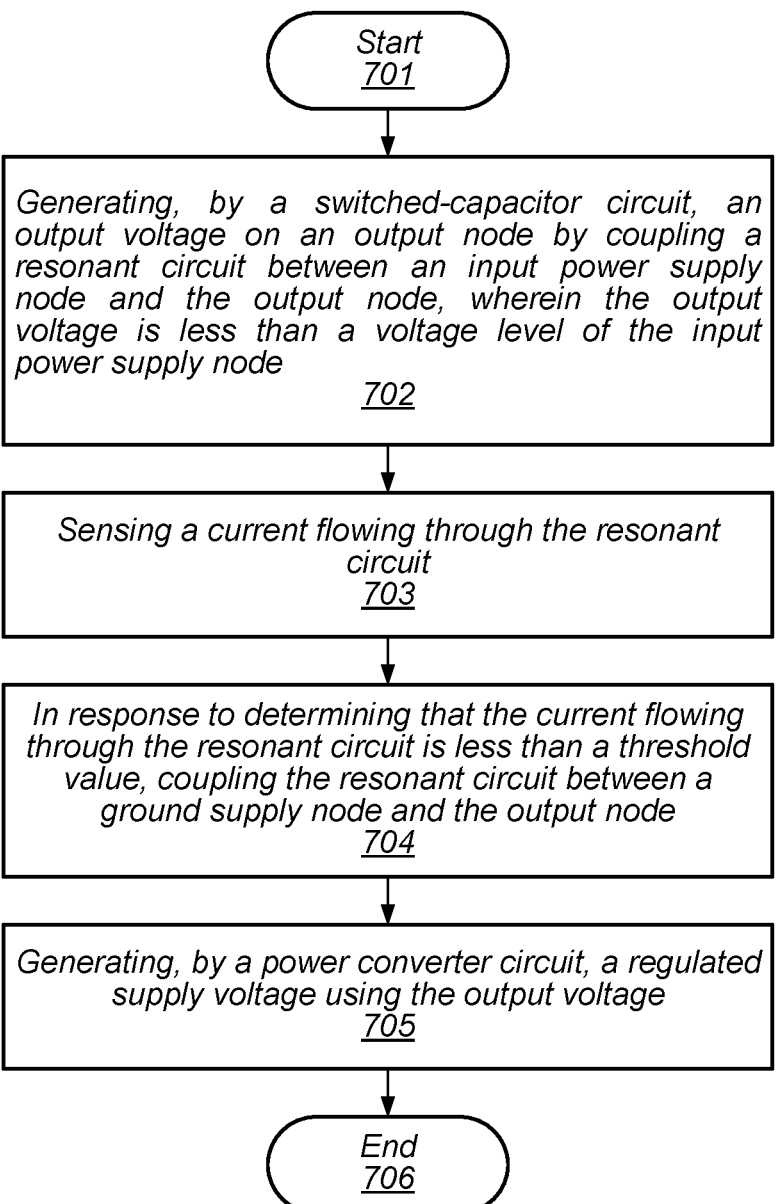

*Start*
*701*

*Generating, by a switched-capacitor circuit, an output voltage on an output node by coupling a resonant circuit between an input power supply node and the output node, wherein the output voltage is less than a voltage level of the input power supply node*
*702*

*Sensing a current flowing through the resonant circuit*
*703*

*In response to determining that the current flowing through the resonant circuit is less than a threshold value, coupling the resonant circuit between a ground supply node and the output node*
*704*

*Generating, by a power converter circuit, a regulated supply voltage using the output voltage*
*705*

*End*
*706*

Input Power
Supply Node
104

Power
Management
Integrated
Circuit
801

Step-Down
Voltage
804

Integrated
Circuit
802

Switched-
Capacitor
Voltage-Divider
Circuit
100

Power
Converter
Circuit
803

SOFT SWITCHING VOLTAGE DIVIDER CIRCUIT

The present application claims priority to U.S. Provisional App. No. 63/476,098 entitled "Soft Switching Voltage Divider Circuit," filed Dec. 19, 2022, the disclosure of which is incorporated by reference herein in its entirety.

BACKGROUND

Technical Field

This disclosure relates to power management in computer systems and, more particularly, to switched-capacitor circuit operation.

Description of the Related Art

Modern computer systems may include multiple circuits blocks designed to perform various functions. For example, such circuit blocks may include processors and/or processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generate regulated voltage levels on respective power supply signals using a voltage level of an input power supply signal. Such power converter circuits may employ multiple passive circuit elements such as inductors, capacitors, and the like.

BRIEF DESCRIPTION OF THE DRAWINGS

FIG. 7 is a flow diagram of an embodiment of a method for operating a switched-capacitor voltage divider circuit.

Figure 1:
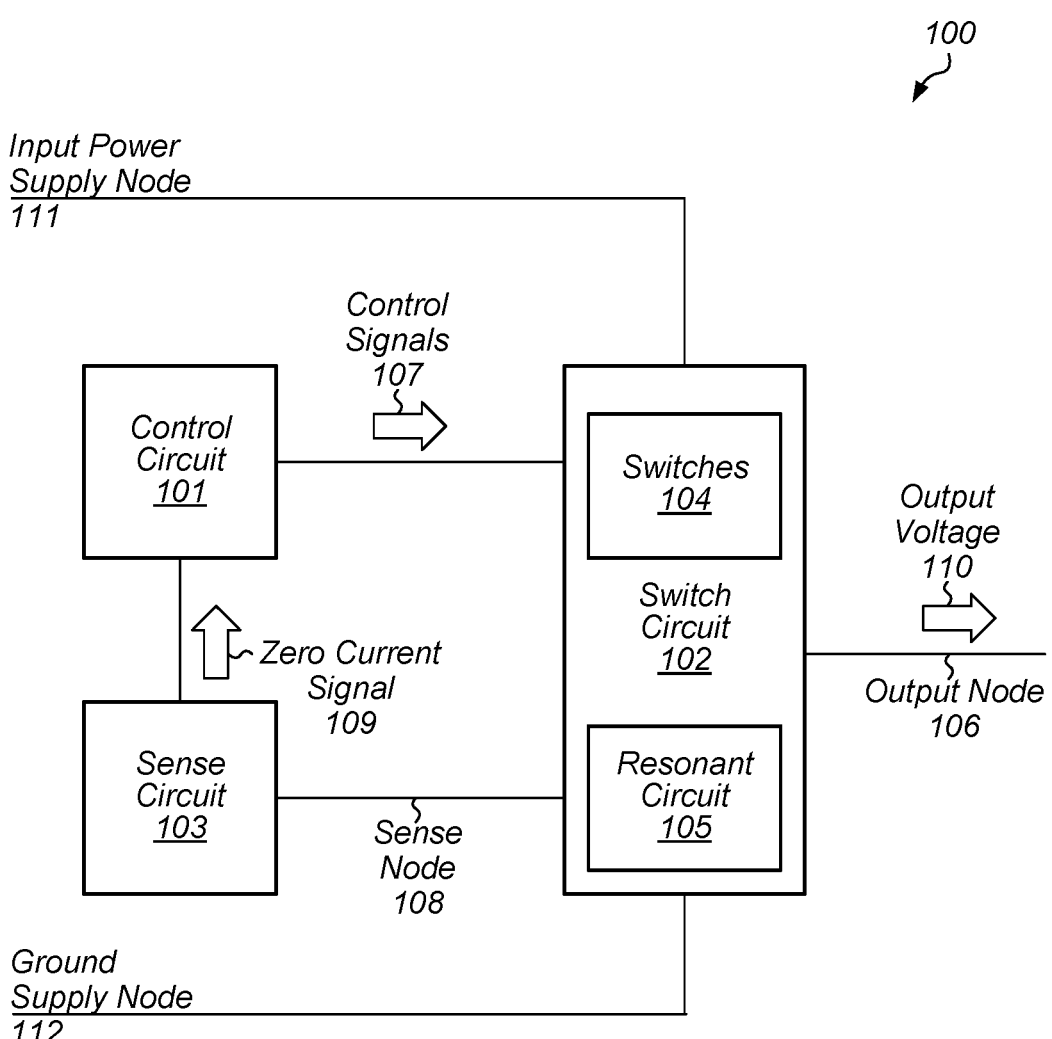
FIG. 1 is a block diagram of an embodiment of a switched-capacitor voltage-divider circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed but, on the contrary, the intention is to cover all modifications, equivalents and alternatives falling within the spirit and scope of the appended claims.

DETAILED DESCRIPTION OF EMBODIMENTS

Different circuit blocks within computer systems often require different power supply voltages. To generate such voltages, computer systems employ various combinations of power converter circuits and voltage regulator circuits. For example, a computer system may employ a buck converter circuit to generate a particular voltage level that is further regulated using multiple low-dropout regulator circuits.

In some cases, the voltage level of the input power supply to a computer system or other electrical system may be much larger than the voltage levels needed for the various circuit blocks included in such systems. To generate useable voltage levels, the voltage level of the input power supply is reduced (or "stepped down") using power converters, voltage regulator circuits, voltage divider circuits, etc. Inefficiencies in such circuits can result in dissipation of power which can manifest as heat. In cases of battery-operated computer systems, such inefficiencies result in charge from the battery needlessly being converted to heat, decreasing battery life.

One source of inefficiency in many switch-based power circuits, e.g., switching regulator circuits, relates to how transistors are switched. Typically, a transistor is switched between an on-state and an off-state by changing a voltage on the transistor's control pin. For example, increasing a gate voltage of an n-channel metal-oxide semiconductor field-effect transistor (MOSFET) from ground to a voltage above a threshold value changes the state of the MOSFET from an off-state to an on-state. When a transistor is switched from an off-state to an on-state, there is a period of time during which there is a voltage across the transistor as current begins to flow through the device. The simultaneous presence of voltage across the transistor and current flowing through the transistor results in power being dissipated in the transistor. A similar event occurs when a transistor is switched from an on-state to an off-state when there is a current flowing through the transistor. Switching a state of a transistor when there is current flowing in the transistor is referred to as "hard switching."

Rather than hard switching transistors, transistors can be switched when there is little or no current flowing in them. This technique is referred to as "soft switching," and can be employed to reduce the amount of heat generated during the switching process, thereby improving the efficiency of the switch. Soft switching can be achieved using a resonant circuit that forces known transitions in the current flowing through switch devices or transistors. By switching the state of a transistor when there is little current flowing through the transistor, the power dissipated by the transistor becomes extremely small.

As used and defined herein, a resonant circuit (also known as a "tank circuit") is a tuned circuit that exchanges is a circuit that repeatedly transfers stored energy between multiple reactive components (e.g., inductors and capacitors). For example, a resonant circuit includes an inductor and a capacitor can transfer via a current energy stored in the inductor's magnetic field to energy stored in the electric field of the capacitor. When the energy is stored in either of the inductor or capacitor, the current flowing between them is negligible and can be used to indicate when soft switching can be performed.

The embodiments described herein employ a switching voltage divider circuit that employs soft switching to reduce the voltage level of an input power supply node to a more useable level in an efficient fashion. Other power converter and voltage regulator circuits can make use of the reduced voltage to generate desired voltage levels. By efficiently reducing the voltage level of the input power supply, the other power converter circuits and voltage regulator circuits do not need to work as hard to generate the desired voltage levels, thereby improving their efficiency as well.

A block diagram depicting an embodiment of a switched-capacitor voltage-divider circuit is illustrated in FIG. 1. As illustrated, switched-capacitor voltage-divider circuit 100 includes control circuit 101 and switch circuit 102, which includes switches 104 and resonant circuit 105. It is noted that switched-capacitor voltage-divider circuit 100 may be used in conjunction with additional power converter and voltage regulator circuits to generate any suitable number of regulated power supply voltage levels that may be used in a variety of applications.

As described below, resonant circuit 105 is coupled between intermediate nodes of switch circuit 102. In various embodiments, switch circuit 102 is configured to couple the intermediate nodes to respective ones of input power supply node 111 and output node 106, allowing current to flow from input power supply node 111, through resonant circuit 105, into output node 106 to generate output voltage 110. In some embodiments, output voltage 110 is less than a voltage level of input power supply node 111. Switch circuit 102 is further configured to couple the intermediate nodes to ground supply node 112 and output node 106, respectively, allowing stored energy in resonant circuit 105 to generate a current that flows into output node 106 to maintain output voltage 110. In various embodiments, switch circuit 102 is configured to change how the intermediate nodes are coupled based on control signals 107.

In some embodiments, sense node 108 is coupled to one of different nodes within switch circuit 102. As described below, in some embodiments, sense node 108 may be coupled to a common node between two of switches 104. Alternatively, sense node 108 may be coupled to a circuit node within resonant circuit 105.

Sense circuit 103 is configured to sense a current flowing through resonant circuit 105. In response to a determination that the current flowing through resonant circuit 105 is less than a threshold value, sense circuit 103 is configured to activate zero current signal 109.

Control circuit 101 is configured to generate control signals 107 using zero current signal 109. To generate control signals 107, control circuit 101 may be configured to activate a subset of control signals 107 is response to an activation of zero current signal 109. In response to a deactivation of zero current signal 109, control circuit 101 may be further configured to activate a different subset of control signals 107. In various embodiments, control circuit 101 may be implemented using any suitable combination of sequential and combinatorial logic circuits.

As used herein, when a signal is activated, it is set to a logic or voltage level that activates a load circuit or device. The logic level may be either a high logic level or a low logic level depending on the load circuit. For example, an active state of a signal coupled to a p-channel MOSFET is a low logic level (referred to as an "active low signal"), while an active state of a signal coupled to an n-channel MOSFET is a high logic level (referred to as an "active high signal").

Switch circuit 102 may be further configured, in response to an activation of particular ones of control signals 107 that correspond to a determination that the current flowing through resonant circuit 105 is less than a threshold value, to couple resonant circuit 105 between ground supply node 112 and output node 106.

By changing the state of control signals 107, in response to a determination that zero current signal 109 has been activated, the respective states of switches 104 are changed when there is little or no current flowing through the switches, effectively soft switching the switches. By employing soft switching, output voltage 110 can be generated more efficiently than other switching circuits that employ hard switching.

As described below, resonant circuit 105 may include a variety of reactive circuit elements. For example, in some embodiments, resonant circuit 105 may include a capacitor coupled, in series, to an inductor, and wherein to sense the current flowing through resonant circuit 105, sense circuit 103 is further configured to determine a voltage level at a terminal of the inductor. In other embodiments, resonant circuit 105 may include a capacitor and a transformer that includes a primary coil and a secondary coil.

Figure 2:
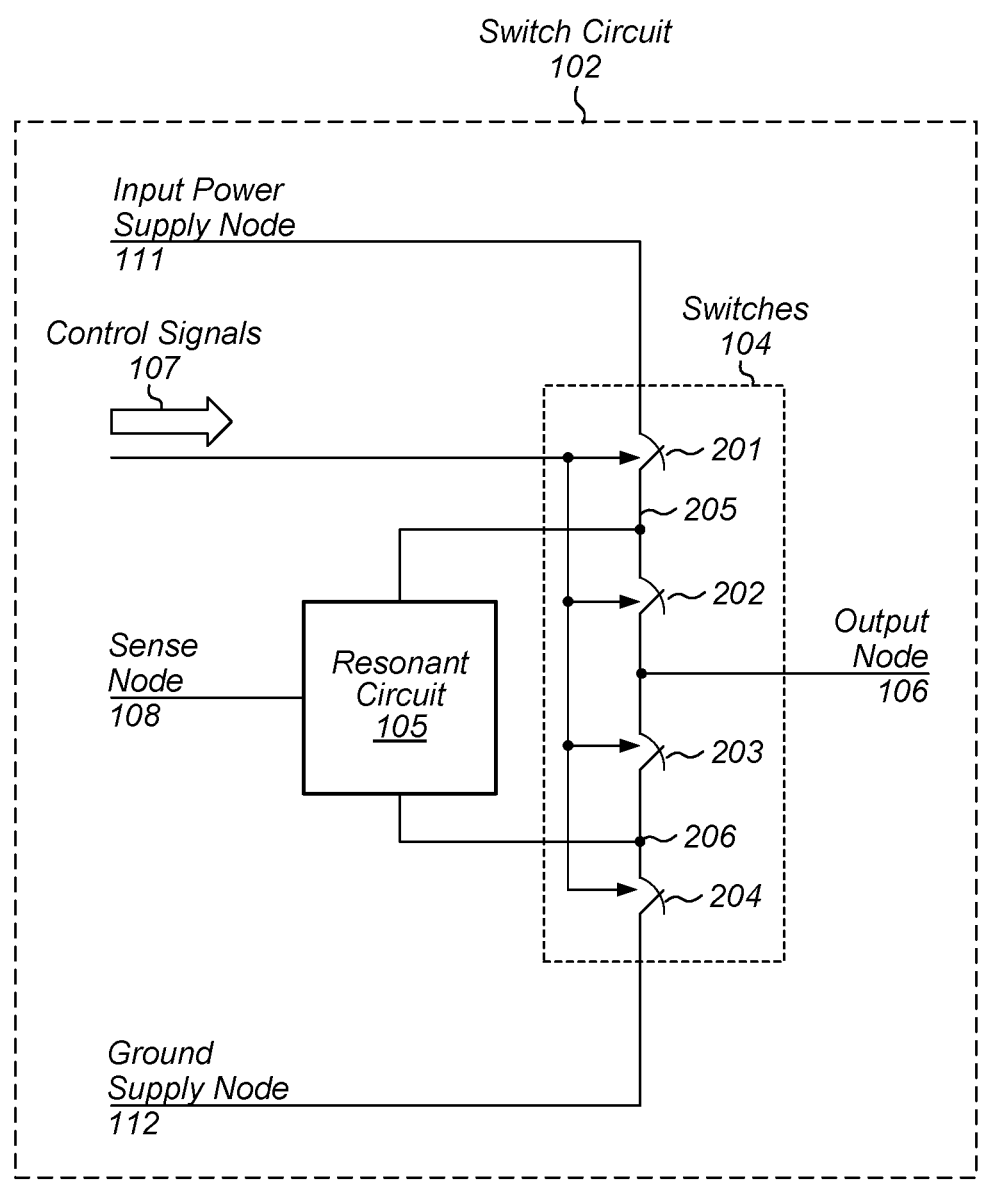
FIG. 2 is a block diagram of an embodiment of a switch circuit.

Turning to FIG. 2, a block diagram of an embodiment of switch circuit 102 is depicted. As illustrated, switch circuit 102 includes resonant circuit 105 and switches 104, which includes switch devices 201-204 that are controlled by corresponding ones of control signals 107.

Switch device 201 is coupled between input power supply node 111 and node 205, and switch device 202 is coupled between node 205 and output node 106. In a similar fashion switch device 203 is coupled between output node 106 and node 206, while switch device 204 is coupled between node 206 and ground supply node 112.

Resonant circuit 105 is coupled between nodes 205 and 206. As described below, in addition to including a capacitor (sometimes referred to as a "flying capacitor" or "fly capacitor" due to sometimes being allow to "fly" or float during certain phases of operation), resonant circuit 105 may include other reactive components, such as inductors.

During a first phase, switch devices 201 and 203 are closed, while switch devices 202 and 204 are open. Closing switch devices 201 and 203 couples node 205 to input power supply node 111, and couples node 206 to output node 106, effectively coupling resonant circuit 105 between input power supply node 111 and output node 106. During the first phase, current flows from input power supply node 111 charging the capacitor in resonant circuit 105, as well as load capacitance on output node 106.

During a second phase, subsequent to the first phase, switch devices 201 and 203 are opened, while switch devices 202 and 204 are closed. Closing switch devices 202 and 204 couples node 205 to output node 106, and couples node 206 to ground supply node 112, effectively coupling resonant circuit 105 between output node 106 and ground supply node 112. During the second phase, charge stored in the capacitor included in resonant circuit 105 flows into the load capacitance on output node 106.

During the first phase, the voltage across resonant circuit 105 is the difference between the respective voltage levels of input power supply node 111 and output node 106, and during the second phase, the voltage across resonant circuit 105 is the voltage level of output node 106. In steady-state operation, no charge accumulates within resonant circuit 105, so the voltages across resonant circuit 105 during both phases must be equal. For this to occur, the voltage level of output node 106 is half the voltage level of input power supply node 111.

Although only two phases are described in the above description, in other embodiments, additional phases, including those where resonant circuit 105 is floating, may be employed. In some embodiments, the use of different numbers of phases, and different configurations of open and closed switch devices in the phases, can produce different voltage levels on output node 106.

To change how resonant circuit 105 is coupled between input power supply node 111, output node 106, and ground supply node 112, different ones of switch devices 201-204 are opened and closed. As described above, the opening and closing of switch devices 201-204 is performed when there is little or no current flowing through resonant circuit 105. By opening and closing switch devices 201-204 under such circumstances, there is little power lost in the switching process, thereby improving the efficiency of switch circuit 102 and, by extension, switched-capacitor voltage-divider circuit 100.

In various embodiments, switch devices 201 and 202 may be implemented as p-channel MOSFETs, fin field-effect transistors (FinFETs), gate-all-around field-effect transistors (GAAFETs), or any other suitable transconductance device. Switch devices 203 and 204 may, in some embodiments, be implemented as n-channel MOSFETs, FinFETS, GAAFETs, or any other suitable transconductance devices. It is noted that, in some embodiments, any of switch devices 201-204 may be implemented using multiple transistors coupled together in parallel.

Figure 3A:
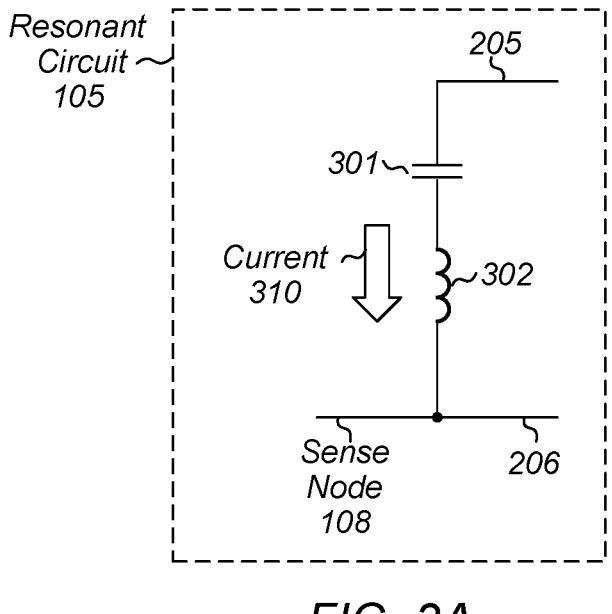
FIG. 3A is a block diagram of an embodiment of a resonant circuit.

Turing to FIG. 3A, a block diagram of an embodiment of resonant circuit 105 is depicted. As illustrated, resonant circuit 105 includes capacitor 301 and inductor 302. Capacitor 301 is coupled between node 205 and inductor 302, which is, in turn, coupled to node 206. It is noted that, in the embodiment of FIG. 3A, sense node 108 corresponds to node 206.

Capacitor 301 is coupled between node 205 and inductor 302 which is, in turn, coupled to node 206. It is noted that, in this embodiment, sense node 108 and node 206 are coupled together as a common circuit node. As described above, different settings for switch devices 201-204 result in current 310 flowing through capacitor 301 and inductor 302. As current 310 flows through capacitor 301 and inductor 302, the voltage level on node 206/sense node 108 changes due to the impedances of capacitor 301 and inductor 302. As described below, the voltage level on node 206/sense node 108 is compared to a reference voltage to determine when a value of current 310 is at or near a zero level.

Values for capacitor 301 and inductor 302 may be selected such that capacitor 301 and inductor 302 resonate at a desired switching frequency for switched-capacitor voltage-divider circuit 100. When operated at their resonant frequency, energy is alternatively stored between the electric field of the capacitor and the magnetic field of the inductor. Under ideal circumstances, such an energy exchange would be self-sustaining but, due to non-ideal resistances in capacitor 301 and inductor 302, energy is dissipated. Lost energy is replenished when node 205 is coupled to input power supply node 111

Capacitor 301 may be implemented using a metal-oxide-metal (MOM) structure, a metal-insulator-metal (MIM) structure, or any other suitable capacitor structure available on a semiconductor manufacturing process. In other embodiments, capacitor 301 may be implemented using a discrete capacitor coupled to a circuit board or other substrate on which switched-capacitor voltage-divider circuit 100 is mounted. Although depicted as a single capacitor, in other embodiments, capacitor 301 may be implemented using multiple capacitors coupled together in any suitable arrangement.

Inductor 302 may be implemented using a coil of metal or any other suitable conductor available on a semiconductor manufacturing process. In other embodiments, inductor 302 may be a discrete inductor coupled to a circuit board or other substrate on which switched-capacitor voltage-divider circuit 100 is mounted. Although inductor 302 is depicted as a single inductor, in other embodiments, inductor 302 may be implemented using multiple inductors coupled together in any suitable arrangement.

It is noted that although capacitor 301 and inductor 302 are depicted as being coupled together in series in the embodiment of FIG. 3A, in other embodiments, capacitor 301 and inductor 302 may be coupled together in parallel.

Figure 3B:
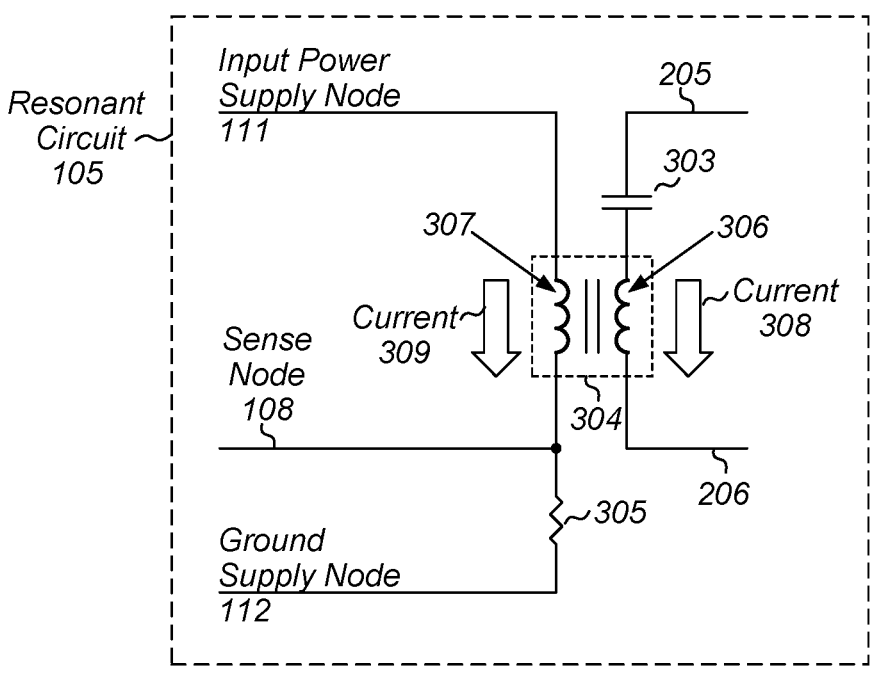
FIG. 3B is a block diagram of another embodiment of a resonant circuit.

Turning to FIG. 3B, a block diagram of a different embodiment of resonant circuit 105 is depicted. As illustrated, resonant circuit 105 includes capacitor 303, transformer 304, which includes primary coil 306 and secondary coil 307, and resistor 305.

Capacitor 303 is coupled between node 205 and primary coil 306 of transformer 304 which is, in turn, coupled to node 206. Secondary coil 307 is coupled between input power supply node 111 and sense node 108. Resistor 305 is coupled between sense node 108 and ground supply node 112.

As described above, different settings for switch devices 201-204 result in current 308 flowing through capacitor 303 and primary coil 306, which generates a magnetic field in response to changes in current 308. The magnetic field induces current 309 in secondary coil 307. As current 309 flows through resistor 305, a voltage is generated on sense node 108 which corresponds to the voltage drop across resistor 305 resulting from current 308. Resistor 305, in various embodiments, functions as a current-to-voltage converter circuit converting current 309 into a voltage level on sense node 108. As described below, the voltage level on sense node 108 can be used to determine when current 309, and by extension current 308, is at or near a zero level.

As with the embodiment of FIG. 3A, respective values of capacitor 303 and primary coil 306 may be selected so that the two components resonate at a desired switching frequency for switched-capacitor voltage-divider circuit 100. In some embodiments, a number of turns of secondary coil 307 may be selected to increase or decrease a value of current 309 relative to current 308.

In various embodiments, transformer 304 may be implemented as concentric coils of metal or other conductive material available on a semiconductor manufacturing process. Alternatively, transformer 304 may be implemented using a discrete transformer coupled to a circuit board or other substrate on which switched-capacitor voltage-divider circuit 100 is mounted.

Capacitor 303 may be implemented using a MOM structure, MIM structure, or any other suitable capacitor structure available on a semiconductor manufacturing process. In other embodiments, capacitor 303 may be implemented using a discrete capacitor coupled to a circuit board or other substrate on which switched-capacitor voltage-divider circuit 100 is mounted.

In various embodiments, resistor 305 may be implemented using metal, polysilicon, or any other suitable material available on a semiconductor manufacturing process. In other embodiments, resistor 305 may be implemented using a discrete resistor coupled to a circuit board or other substrate on which switched-capacitor voltage-divider circuit 100 is mounted. Although resistor 305 is depicted as a single resistor, in other embodiments, resistor 305 may be implemented using any suitable series and/or parallel combination of resistors.

Figure 4:
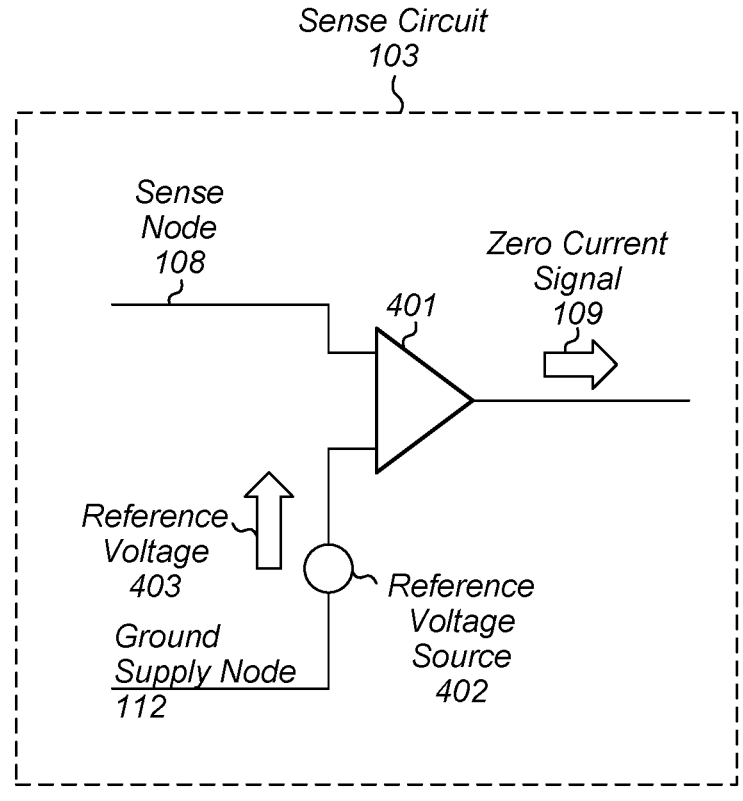
FIG. 4 is a block diagram of an embodiment of a sensor circuit.

A block diagram of an embodiment of sense circuit 103 is depicted in FIG. 4. As illustrated, sense circuit 103 includes comparator circuit 401 and reference voltage source 402.

Comparator circuit 401 is configured to generate zero current signal 109 using a voltage level of sense node 108 and reference voltage 403. In various embodiments, to generate zero current signal 109, comparator circuit 401 may be further configured to perform a comparison of the voltage level of sense node 108 to reference voltage 403, and activate zero current signal 109 based on a result of the comparison.

Comparator circuit 401 may, in some embodiments, be implemented using a Schmitt trigger circuit. In other embodiments, comparator circuit 401 may be implemented using a differential amplifier circuit, or any other suitable comparator circuit configured to generate a digital output based on a comparison of at least two analog voltage levels.

Reference voltage source 402 is coupled between ground supply node 112 and an input of comparator circuit 401, and is configured to generate reference voltage 403. In various embodiments, a value of reference voltage 403 can be selected to coincide with a voltage level of sense node 108 that is indicative of zero current flowing through resonant circuit 105.

Reference voltage source 402 may be implemented using a bandgap reference circuit, or any other suitable supply and/or temperature independent reference circuit. In some embodiments, reference voltage source 402 may be adjustable or trimmable post-manufacture to allow for variation in other component values within switched-capacitor voltage-divider circuit 100.

Figure 5A:
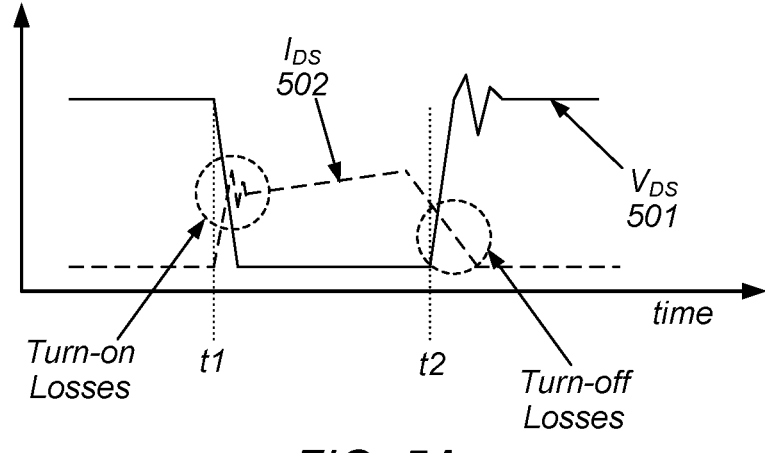
FIG. 5A illustrates example waveforms associated with hard switching a transistor.

Turning to FIG. 5A, example waveforms associated with hard switching a transistor are depicted. It is noted that the transistor may correspond to any of switch devices 201-204 as depicted in FIG. 2. Prior to time t1, the drain-to-source voltage of the transistor (denoted as "VDS 501") is at a non-zero value, while the drain-to-source current of the transistor (denoted as "IDS 502") is at a zero value.

At time t1, the state of the transistor is changed from an off-state to an on-state. As described above, the change of state may be accomplished by changing a voltage level applied to the gate of the transistor. As the gate voltage is changed, the transistor begins to conduct, allowing $I_{DS}$ 502 to increase as $V_{DS}$ 501 begins to decrease. There is a period of time where $V_{DS}$ 501 is non-zero and $I_{DS}$ 502 is also non-zero, which results in turn-on losses as the transistor dissipates power because both $V_{DS}$ 501 and $I_{DS}$ 502 are both non-zero simultaneously.

At time t2, the state of the transistor is changed from an on-state to an off-state. As the gate voltage changes, $V_{DS}$ 501 increases, while $I_{DS}$ 502 is at a non-zero value. As with the turn-on case, the turn-off case also has a period of time during which $V_{DS}$ 501 and $I_{DS}$ 502 are both non-zero simultaneously, resulting in power dissipation.

It is noted that the waveforms depicted in FIG. 5A are merely examples. In other embodiments, the waveforms for $I_{DS}$ 502 and $V_{DS}$ 501 may have different magnitudes and different relative timings. It is further noted that although the waveforms are described using terminology related to MOS-FETs, in various embodiments, other types of transistors may exhibit similar behavior.

As described above, soft switching may be employed to reduce the power dissipation during switching from an on-state to an off-state and vice versa. Example waveforms for soft switching a transistor are depicted in FIG. 5B.

At time t1, the state of the transistor is switched from an off-state to an on-state. In this case, the switching is performed when the drain-to-source current of the transistor (denoted as $I_{DS}$ 504) is within a threshold value of zero. The drain-to-source voltage of the transistor (denoted as $V_{DS}$ 503) changes from a non-zero value to a zero value. During the transition of $V_{DS}$ 503, there is little time during which both $V_{DS}$ 503 and $I_{DS}$ 504 are both non-zero. Since there is no time when both $V_{DS}$ 503 and $I_{DS}$ 504 are both non-zero, the turn-on losses are negligible.

At time t2, the state of the transistor is changed from an on-state to an off-state. Time t2 is selected to coincide with $I_{DS}$ 504 being less than a threshold level so that when $V_{DS}$ 503 changes from a zero value to a non-zero value, there is little time during which $V_{DS}$ 503 and $I_{DS}$ 504 are both non-zero, resulting in negligible turn-off losses.

Figure 5B:
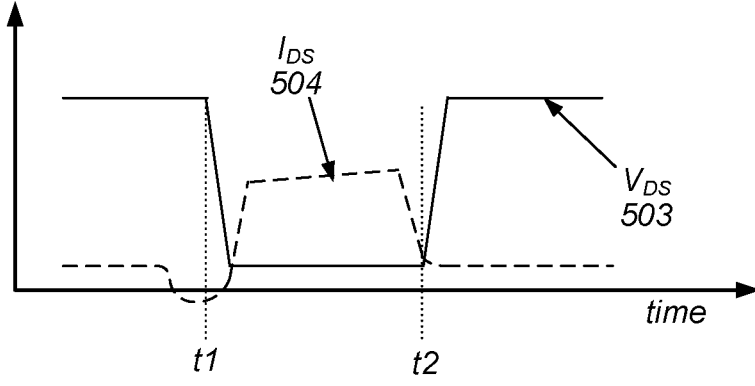
FIG. 5B illustrates example waveforms associated with soft switching a transistor.

It is noted that the waveforms depicted in FIG. 5B are merely examples. In other embodiments, the waveforms for $I_{DS}$ 504 and $V_{DS}$ 503 may have different magnitudes and different relative timings. It is further noted that although the waveforms are described using terminology related to MOS-FETs, in various embodiments, other types of transistors may exhibit similar behavior.

Figure 6:
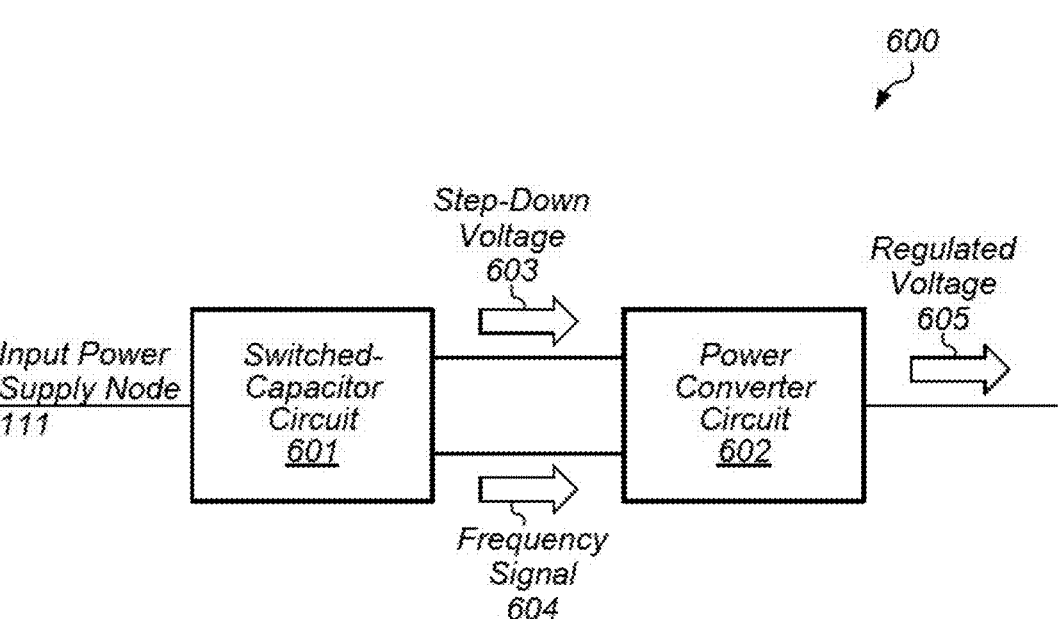
FIG. 6 is a block diagram of an embodiment of a power supply subsystem.

Turning to FIG. 6, a block diagram of an embodiment of a power supply subsystem is depicted. As illustrated, power supply subsystem 600 includes switched-capacitor circuit 601 and power converter circuit 602. In various embodiments, switched-capacitor circuit 601 may correspond to switched-capacitor voltage-divider circuit 100 as depicted in FIG. 1.

In various embodiments, switched-capacitor circuit 601 is configured to generate step-down voltage 603 using a voltage level of input supply node 111. It is noted that step-down voltage 603 can be less than input voltage 606. As described above, switched-capacitor circuit 601 may be configured to switch a resonant circuit between an input power supply node, a ground node, and an output node based on current flowing through the resonant circuit.

In some embodiments, switched-capacitor circuit 601 may be configured to open and close switches to modify to which nodes the resonant circuit is coupled in response to a determination that the current flowing through the resonant circuit is less than a threshold value. By changing the switch position when the current flowing through the resonant circuit is near zero, power dissipated by the switches can be minimized, thereby improving the efficiency of the switched-capacitor circuit 601.

In some cases, switched-capacitor circuit 601 may be further configured to generate frequency signal 604. In various embodiments, a control circuit, such as control circuit 101, may be configured to generate frequency signal 604 using information indicative of when the current flowing through the resonant circuit is less than a threshold value. Switched-capacitor circuit 601 may be further configured to relay frequency signal 604 to power converter circuit 602.

Power converter circuit 602 is configured to generate regulated voltage 605 using step-down voltage 603. In various embodiments, power converter circuit 602 may be implemented using a buck converter circuit, or any other suitable power converter circuit. Since the voltage level of step-down voltage 603 is less than the voltage level of input power supply node 111, smaller transistors may be employed in power converter circuit 602, thereby allowing higher switching frequencies and improved efficiency.

In various embodiments, power converter circuit 602 may be further configured to generate regulated voltage 605 using frequency signal 604. By employing frequency signal 604, power converter circuit 602 may operate at a higher frequency that is a harmonic of the operating frequency of switched-capacitor circuit 601, reducing the likelihood of instability within power supply subsystem 600.

It is noted that although a single power converter circuit is depicted in the embodiment of FIG. 6, in other embodiments, multiple power converter circuits may be employed, each using step-down voltage 603 to generate corresponding regulated voltages.

Various embodiments of a switched-capacitor voltage-divider circuit have been disclosed. Broadly speaking, a switch circuit, which includes a resonant circuit, a sense circuit, a control circuit, and a plurality of switches, may be configured to couple the resonant circuit between an input power supply node and an output node to generate an output voltage on the output node. In various embodiments, the output voltage is less than a voltage level of the input power supply node. A sense circuit may be configured to sense a current flowing through the resonant circuit and activate zero current signal in response to a determination that the current flowing through the resonant circuit is less than a threshold value. A control circuit may be configured to activate particular ones of the plurality of control signals in response to an activation of the zero current signal, and the switch circuit may be further configured to couple the resonant circuit between a ground supply node and the output node in response to an activation of the particular ones of the plurality of control signals.

Turning to FIG. 7, a flow diagram depicting an embodiment of a method for operating a switched-capacitor voltage-divider circuit is illustrated. The method, which begins at block 701, may be applied to various switched-capacitor voltage-divider circuits including switched-capacitor voltage-divider circuit 100 as depicted in FIG. 1.

The method includes generating, by a switched-capacitor circuit, an output voltage on an output node by coupling a resonant circuit between an input power supply node and the output node, wherein the output voltage is less than a voltage level of the input power supply node (block 702). In various embodiments, coupling the resonant circuit between the input power supply node and the output node may include activating or deactivating one or more switches of a plurality of switches included in the switched-capacitor circuit.

The method also includes sensing a current flowing through the resonant circuit (block 703). In some embodiments, the resonant circuit includes a capacitor coupled, in series, to an inductor. In such cases, sensing the current flowing through the resonant circuit may include determining a voltage level at a terminal of the inductor. The method may additionally include performing a comparison of the voltage level at the terminal of the inductor to a threshold voltage, and activating a control signal using a result of the comparison. In such cases, the method may also include activating at least one switch of a plurality of switches included in the switched-capacitor circuit in response to activating the control signal.

In some embodiments, the resonant circuit includes a capacitor and a transformer, where the capacitor is coupled in series with a primary coil of the transformer. In such cases, sensing the current flowing through the resonant circuit includes generating a primary current in the primary coil, inducing, by a magnetic field of the primary coil, a secondary current in a secondary coil included in the transformer, and sensing the secondary current.

When a transformer is employed in the resonant circuit, the method may, in some embodiments, also include generating a sense voltage using the secondary current and a resistor coupled to the secondary coil, and performing a comparison of the sense voltage to a threshold voltage. The method may additionally include activating a control signal using a result of the comparison, and activating at least one switch of a plurality of switches included in the switched-capacitor circuit in response to activating the control signal.

The method further includes, in response to determining that the current flowing through the resonant circuit is less than a threshold value, coupling the resonant circuit between a ground supply node and the output node (block 704). In various embodiments, coupling the resonant circuit between the ground supply node and the output node may include activating or deactivating different ones of the plurality of switches included in the switched-capacitor circuit.

The method also includes generating, by a power converter circuit, a regulated supply voltage using the output voltage (block 705). In some embodiments, the method may further include determining, by the switched-capacitor circuit, a switching frequency of the switched-capacitor circuit using the current flowing through the resonant circuit, and sending, by the switched-capacitor circuit, the switching frequency to the power converter circuit. In such cases, the method may additionally include generating the regulated supply voltage by the power converter circuit using the output voltage and the switching frequency. The method concludes in block 706.

Figure 8:
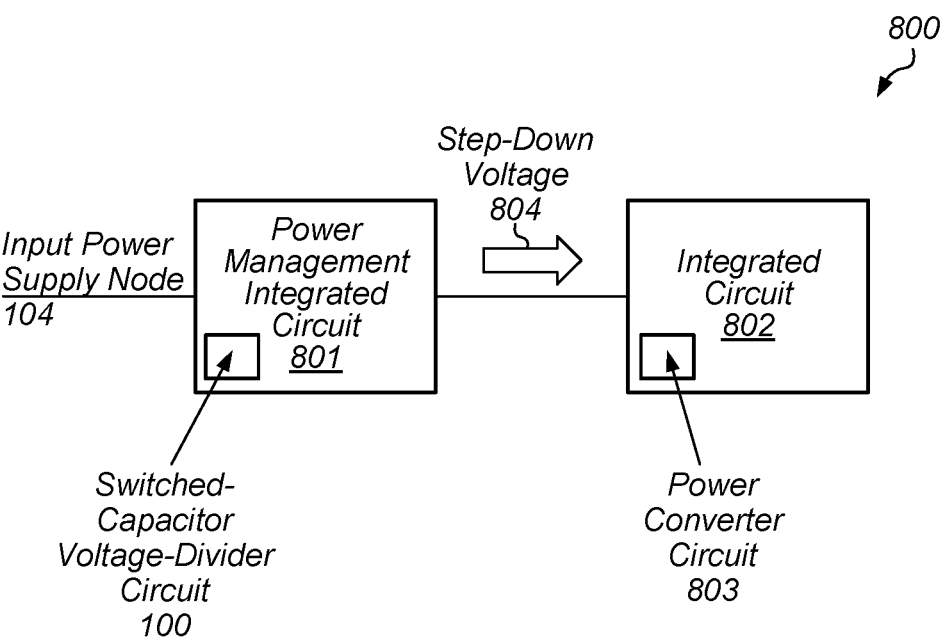
FIG. 8 is a block diagram of a computer system that includes a power management integrated circuit.

Turning to FIG. 8, a block diagram of an embodiment of a power delivery system is depicted. As illustrated, power delivery system 800 includes power management integrated circuit 801 and integrated circuit 802. It is noted that power delivery system 800 may be included in a computer system, an appliance, or any other suitable application that requires the generation of one or more regulated supply voltages.

Power management integrated circuit 801 includes switched-capacitor voltage-divider circuit 100 as depicted in FIG. 1. In various embodiments, switched-capacitor voltage-divider circuit 100 is configured to generate step-down voltage 804 using a voltage level of input power supply node 111. In some embodiments, the voltage level of input power supply node 111 may be provided by a battery or other suitable direct current (DC) voltage source.

Although power management integrated circuit 801 is depicted as including a single circuit block, i.e., switched-capacitor voltage-divider circuit 100, in other embodiments, power management circuit 801 may include additional circuit blocks. For example, in some embodiments, power management integrated circuit 801 may include voltage and/or current reference circuits, input/output circuits for communication with other integrated circuits, and the like.

Integrated circuit 802 includes power converter circuit 803, which is configured to generate a regulated output voltage using step-down voltage 804. In various embodiments, power converter circuit 803 may be implemented using a buck converter or any other type of switching regulator circuit. In some embodiments, power converter circuit 803 may use frequency information from switched-capacitor voltage-divider circuit 100 to determine a switching frequency.

Although integrated circuit 802 is depicted as including a single power converter circuit, in other embodiments, multiple power converter circuits may be employed. Alternatively, or additionally, step-down voltage 804 may be routed to other integrated circuits or standalone power converter circuits. It is noted that although integrated circuit 802 is depicted as including only power converter circuit 803, in other embodiments, integrated circuit 802 may include other circuit blocks such as processor circuits, memory circuits, input/output circuits, and the like.

In various embodiments, power management integrated circuit 801 and integrated circuit 802 may be mounted on a common circuit board or substrate. In other embodiments, power management integrated circuit 801 and integrated circuit 802 may be mounted on different circuit boards or substrates. In such cases, a wire or other suitable conductor or cable can be employed to provide step-down voltage 804 to integrated circuit 802.

Figure 9:
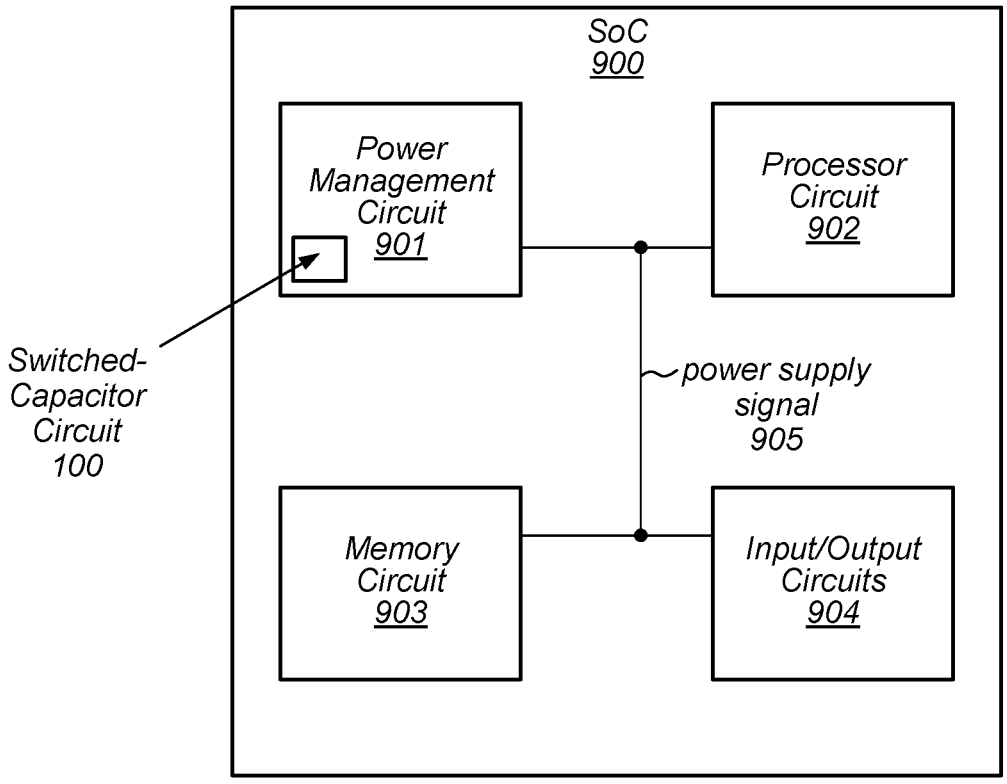
FIG. 9 is a block diagram of one embodiment of a system-on-a-chip that includes a power management circuit.

A block diagram of a system-on-a-chip (SoC) is illustrated in FIG. 9. In the illustrated embodiment, SoC 900 includes power management circuit 901, processor circuit 902, input/output circuits 904, and memory circuit 903, each of which is coupled to power supply signal 905. In various embodiments, SoC 900 may be configured for use in a desktop computer, server, or in a mobile computing application such as, e.g., a tablet, laptop computer, or wearable computing device.

Power management circuit 901 includes switched-capacitor voltage-divider circuit 100, which is configured to generate a step-down voltage used to generate a regulated voltage level on power supply signal 905 in order to provide power to processor circuit 902, input/output circuits 904, and memory circuit 903. Although power management circuit 901 is depicted as including a single power converter circuit, in other embodiments, any suitable number of power converter circuits may be included in power management circuit 901, each configured to generate a regulated voltage level on a respective one of multiple internal power supply signals included in SoC 900.

Processor circuit 902 may, in various embodiments, be representative of a general-purpose processor that performs computational operations. For example, processor circuit 902 may be a central processing unit (CPU) such as a microprocessor, a microcontroller, an application-specific integrated circuit (ASIC), or a field-programmable gate array (FPGA).

Memory circuit 903 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that, although a single memory circuit is illustrated in FIG. 9, in other embodiments, any suitable number of memory circuits may be employed.

Input/output circuits 904 may be configured to coordinate data transfer between SoC 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 904 may be configured to implement a version of Universal Serial Bus (USB) protocol or IEEE 1394 (Firewire®) protocol.

Input/output circuits 904 may also be configured to coordinate data transfer between SoC 900 and one or more devices (e.g., other computing systems or integrated circuits) coupled to SoC 900 via a network. In one embodiment, input/output circuits 904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 904 may be configured to implement multiple discrete network interface ports.

Figure 10:
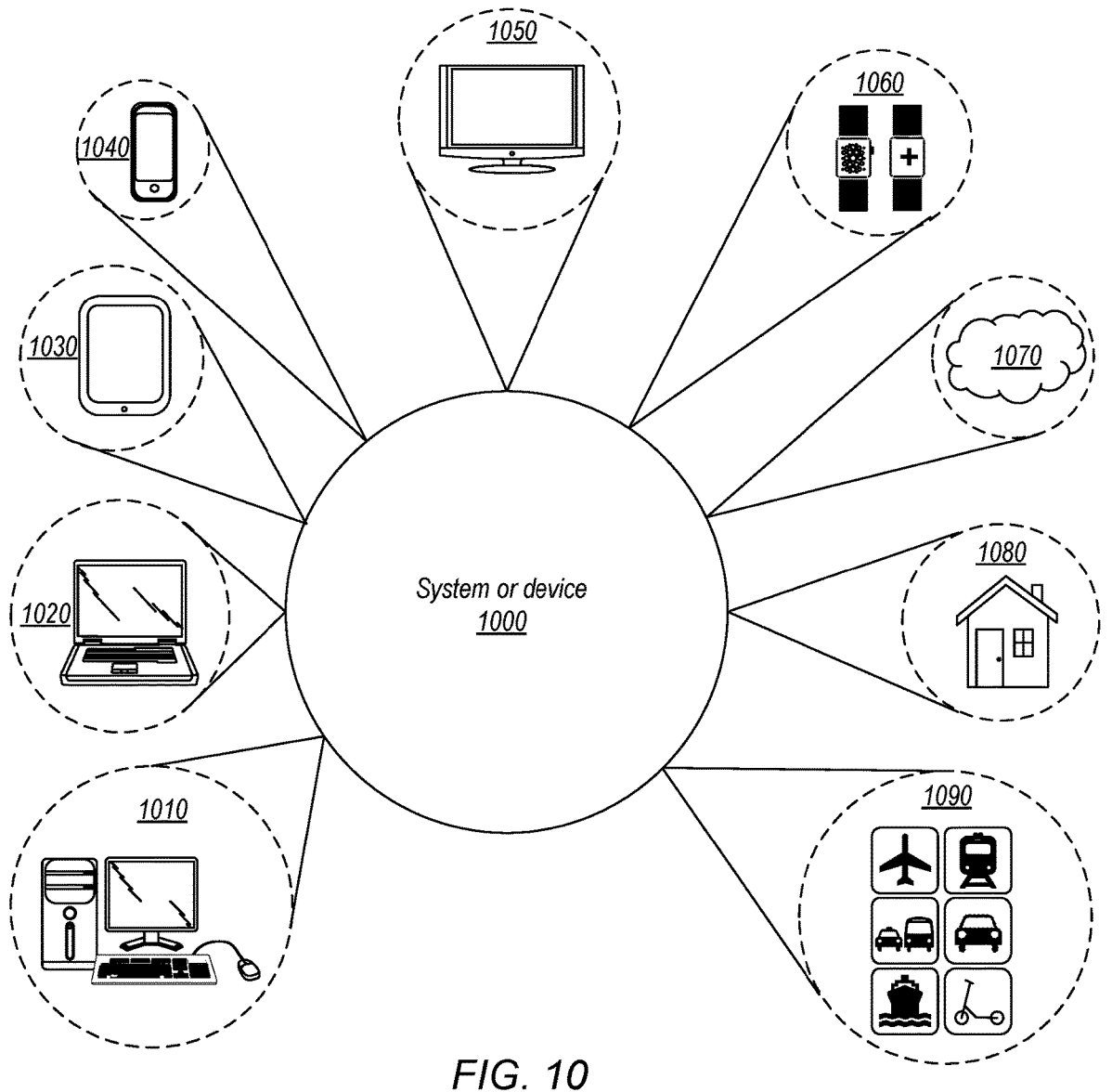
FIG. 10 is a block diagram of various embodiments of computer systems that may include power converter circuits.

Turning now to FIG. 10, various types of systems that may include any of the circuits, devices, or systems discussed above are illustrated. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Figure 11:
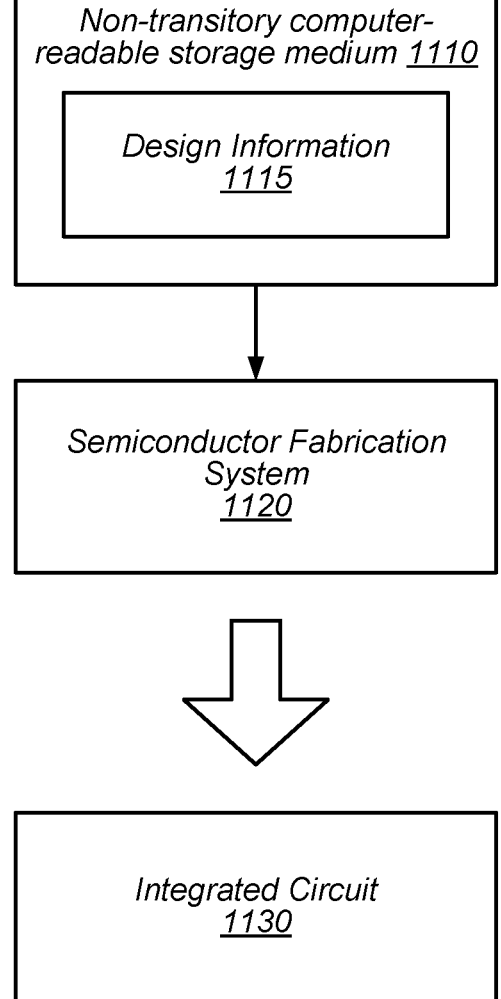
FIG. 11 illustrates an example of a non-transitory computer-readable storage medium that stores circuit design information.

FIG. 11 is a block diagram illustrating an example of a non-transitory computer-readable storage medium that stores circuit design information, according to some embodiments. In the illustrated embodiment, semiconductor fabrication system 1120 is configured to process design information 1115 stored on non-transitory computer-readable storage medium 1110 and fabricate integrated circuit 1130 based on design information 1115.

Non-transitory computer-readable storage medium 1110 may comprise any of various appropriate types of memory devices or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums, which may reside in different locations, e.g., in different computer systems that are connected over a network.

Design information 1115 may be specified using any of various appropriate computer languages, including hardware description languages such as, without limitation: VHDL, Verilog, SystemC, System Verilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor-level netlists, mask design data, characterization data, and the like, of cells included in the cell library.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor-level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third," when applied to a particular feature, do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
a switch circuit that includes a resonant circuit and a plurality of switches, wherein
the switch circuit is configured to couple, based on a plurality of control signals, the resonant circuit between an input power supply node and an output node,
the resonant circuit includes a transformer, a capacitor coupled in series with a primary coil of the transformer and a resistor coupled to a secondary coil of the transformer, wherein the resistor is configured to generate a sense voltage using a secondary current induced in the secondary coil, and
the switch circuit is configured to generate an output voltage on the output node, wherein the output voltage is less than a voltage level of the input power supply node;
a sense circuit configured to sense a current flowing through the resonant circuit and activate a zero current signal in response to a determination that the current flowing through the resonant circuit is less than a threshold value, wherein the sense circuit is further configured to
perform a comparison of the sense voltage to a threshold voltage, and
activate the zero current signal using a result of the comparison; and
a control circuit configured to activate particular ones of the plurality of control signals in response to an activation of the zero current signal; and
wherein the switch circuit is further configured to couple the resonant circuit between a ground supply node and the output node, and to activate at least one switch of the plurality of switches, in response to an activation of the particular ones of the plurality of control signals.

2. The apparatus of claim 1, further comprising a power converter circuit configured to generate a regulated supply voltage using the output voltage.

3. The apparatus of claim 1, wherein the switch circuit is configured to couple the resonant circuit between the ground supply node and the output node by coupling a first intermediate node between a first pair of switches in the switch circuit to the output node and a second intermediate node between a second pair of switches in the switch circuit to the ground supply node.

4. A method, comprising:
generating, by a switched-capacitor circuit, an output voltage on an output node by coupling a resonant circuit between an input power supply node and the output node, wherein the output voltage is less than a voltage level of the input power supply node;
sensing a current flowing through the resonant circuit;
in response to determining that the current flowing through the resonant circuit is less than a threshold value, coupling the resonant circuit between a ground supply node and the output node;
generating, by the switched-capacitor circuit using the current flowing through the resonant circuit, a frequency signal reflecting a switching frequency of the switched-capacitor circuit;
sending the frequency signal to a power converter circuit; and
generating, by the power converter circuit, a regulated supply voltage using the output voltage.

5. The method of claim 4, wherein the resonant circuit includes a capacitor coupled, in series, to an inductor, and wherein sensing the current flowing through the resonant circuit includes determining a voltage level at a terminal of the inductor.

6. The method of claim 5, further comprising:
performing a comparison of the voltage level at the terminal of the inductor to a threshold voltage;
activating a control signal using a result of the comparison; and
activating at least one switch of a plurality of switches included in the switched-capacitor circuit in response to activating the control signal.

7. The method of claim 4, wherein the resonant circuit includes a capacitor and a transformer, wherein the capacitor is coupled in series with a primary coil of the transformer, and wherein sensing the current flowing through the resonant circuit includes:
generating a primary current in the primary coil;
inducing, by a magnetic field of the primary coil, a secondary current in a secondary coil included in the transformer; and
sensing the secondary current.

8. The method of claim 7, further comprising:
generating a sense voltage using the secondary current and a resistor coupled to the secondary coil;
performing a comparison of the sense voltage to a threshold voltage;
activating a control signal using a result of the comparison; and
activating at least one switch of a plurality of switches included in the switched-capacitor circuit in response to activating the control signal.

9. The method of claim 4, further comprising generating the regulated supply voltage by the power converter circuit using the output voltage and the frequency signal.

10. An apparatus, comprising:
a switched-capacitor circuit that includes a resonant circuit, wherein the switched-capacitor circuit is configured to:
couple the resonant circuit between an input power supply node and an output node;
to generate an output voltage on the output node, wherein the output voltage is less than a voltage level of the input power supply node;
sense a current flowing through the resonant circuit; and
in response to a determination that the current flowing through the resonant circuit is less than a threshold value, couple the resonant circuit between a ground supply node and the output node; and a power converter circuit configured to generate a regulated supply voltage using the output voltage, wherein the switched-capacitor circuit is further configured to:
generate a frequency signal reflecting a switching frequency of the switched-capacitor circuit using the current flowing through the resonant circuit; and
send the frequency signal to the power converter circuit.

11. The apparatus of claim 10, wherein the resonant circuit includes a capacitor coupled, in series, to an inductor, and wherein to sense the current flowing through the resonant circuit, the switched-capacitor circuit is further configured to determine a voltage level at a terminal of the inductor.

12. The apparatus of claim 11, wherein the switched-capacitor circuit is further configured to:
perform a comparison of the voltage level at the terminal of the inductor to a threshold voltage;
activate a control signal using a result of the comparison; and
activate at least one switch of a plurality of switches included in the switched-capacitor circuit in response to an activation of the control signal.

13. The apparatus of claim 10, wherein the resonant circuit includes a capacitor and a transformer, wherein the capacitor is coupled in series with a primary coil of the transformer, and wherein to sense the current flowing through the resonant circuit, the switched-capacitor circuit is further configured to:
generate a primary current in the primary coil;
induce, by a magnetic field of the primary coil, a secondary current in a secondary coil included in the transformer; and
sense the secondary current.

14. The apparatus of claim 13, wherein the switched-capacitor circuit is further configured to:
generate a sense voltage using the secondary current and a resistor coupled to the secondary coil;
perform a comparison of the sense voltage to a threshold voltage;
activate a control signal using a result of the comparison; and
activate at least one switch of a plurality of switches included in the switched-capacitor circuit in response to activating the control signal.

15. The apparatus of claim 10, wherein the power converter circuit is further configured to generate the regulated supply voltage using the output voltage and the frequency signal.

* * * * *